US008727828B2

(12) United States Patent
Pribbanow

(10) Patent No.: US 8,727,828 B2
(45) Date of Patent: *May 20, 2014

(54) WILD GAME CALL APPARATUS AND METHOD

(75) Inventor: Troy T. Pribbanow, Rpy, UT (US)

(73) Assignee: Duel Game Calls, LLC, Henrietta, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/221,730

(22) Filed: Aug. 30, 2011

(65) Prior Publication Data

US 2013/0052908 A1    Feb. 28, 2013

Related U.S. Application Data

(63) Continuation of application No. 12/185,735, filed on Aug. 4, 2008, now Pat. No. 8,016,637, which is a continuation-in-part of application No. 10/377,941, filed on Mar. 1, 2003, now Pat. No. 7,465,213.

(60) Provisional application No. 60/953,762, filed on Aug. 3, 2007, provisional application No. 60/361,046, filed on Mar. 1, 2002.

(51) Int. Cl.
*A63H 5/00* (2006.01)

(52) U.S. Cl.
USPC .......................................... 446/207; 446/202

(58) Field of Classification Search
USPC ....................................................... 446/207
See application file for complete search history.

(56) References Cited

U.S. PATENT DOCUMENTS

| 321,202 | A | | 6/1885 | Fisher et al. |
| 632,184 | A | | 8/1899 | Johnson et al. |
| 747,078 | A | | 12/1903 | Leipold |
| 1,383,878 | A | | 7/1921 | Taylor |
| 2,551,367 | A | | 5/1951 | Fahey |
| 2,777,251 | A | | 1/1957 | Bailey |
| 3,054,216 | A | | 9/1962 | Testo |
| 3,466,794 | A | | 9/1969 | Pritchard et al. |
| 3,529,505 | A | | 9/1970 | Brooks |
| 3,802,120 | A | | 4/1974 | Erhart |
| 3,900,993 | A | | 8/1975 | Betters |
| 3,928,935 | A | | 12/1975 | Beadles, Jr. |
| 4,034,499 | A | * | 7/1977 | Wild ............................ 446/215 |
| 4,054,134 | A | * | 10/1977 | Kritzer .................... 128/205.24 |
| 4,737,130 | A | | 4/1988 | Mann |
| 4,821,670 | A | | 4/1989 | Foxcroft et al. |
| 4,885,971 | A | | 12/1989 | Ostendorf |
| 4,888,903 | A | | 12/1989 | Knight et al. |
| 5,160,815 | A | | 11/1992 | Prater |
| 5,735,725 | A | | 4/1998 | Primos |
| 5,885,125 | A | | 3/1999 | Primos |

(Continued)

Primary Examiner — Michael Dennis
(74) Attorney, Agent, or Firm — Hiscock & Barclay LLP

(57) ABSTRACT

A wild game call may include a resonance piece. The resonance piece may include a body, pipes, and a plug that may attach to a mouth piece. Also a wild game call may include a mouth piece attached to the body. Additionally, the mouth piece may include a reed and a neck.

Alternatively, a wild game call may include pipes of variable lengths attached to a splitter, which combines two pipe openings into one pipe opening. Also, a front pipe may be attached to the one pipe opening of the splitter. Additionally, a wild game call may include a mouthpiece attached to the front pipe comprising openings for exhaling, a reed; and fasteners to attach the reed to the mouth piece.

19 Claims, 8 Drawing Sheets

(56) References Cited

U.S. PATENT DOCUMENTS

| | | |
|---|---|---|
| 5,885,126 A | 3/1999 | Carlson |
| 6,053,794 A * | 4/2000 | Weiser .................. 446/207 |
| 6,120,341 A | 9/2000 | Hafford |
| 6,413,139 B1 | 7/2002 | Douglas |
| 6,413,140 B1 | 7/2002 | Primos |
| 6,491,564 B1 | 12/2002 | Miller |
| 6,926,578 B1 | 8/2005 | Casias et al. |
| 7,145,067 B2 | 12/2006 | Pfortmiller et al. |
| 7,445,537 B2 * | 11/2008 | Langenfeld .................. 446/213 |
| 7,465,213 B1 | 12/2008 | Pribbanow |
| 2002/0061703 A1 | 5/2002 | Greenwaldt |
| 2003/0082988 A1 | 5/2003 | Gendron et al. |
| 2009/0191786 A1 * | 7/2009 | Pribbanow .................. 446/207 |

* cited by examiner

WILD GAME CALL APPARATUS AND METHOD

RELATED APPLICATIONS

This application is a continuation of and claims the benefit of co-pending U.S. patent application Ser. No. 12/185,735, filed on Aug. 4, 2008, which claims the benefit of priority to U.S. Provisional Patent Application Ser. No. 61/361,046, filed on Aug. 3, 2007 and which is a continuation-in-part of U.S. patent application Ser. No. 10,377,941, filed on Mar. 3, 2003, now U.S. Pat. No. 7,465,213, which claims the benefit of priority to U.S. Provisional Patent Application Ser. No. 60/953,762, filed on Mar. 1, 2002, all of which are incorporated herein by reference in their entirety.

BACKGROUND

1. The Field of the Invention

This invention relates to wild game calls apparatus and methods for producing a wide range of game calls (e.g., from quiet to loud chirps, mews, bugling, and estrous whines).

2. The Background Art

The sport of hunting often requires the use of game calls in order to attract or locate an animal being hunted. Also, wildlife enthusiasts often require the use of game calls in order to attract or locate animals to observe in their natural habitat.

Different types of calls have been invented for the use in outdoor hunting sports and for the use by wildlife enthusiasts. Separate game calls have been devised that are designed to attract certain animals, such as turkeys, deer, elk, moose, coyotes, etc. Normally, these game calls are specialized as to the type of the animal sought, or even to the type of animal sound meant to be mimicked, such as the grunt of a red deer.

Oftentimes, game calls allow the users to change the length of the vibration of the reed in order to change the sound of the call. Other devices contain different chambers to mimic the sounds made by a wide variety of different animals, where restrictions to the airflow to the chambers changes the tone of the call. Other types of devices have been designed to allow the user to change the sound produced by a device. The sound can be changed by the user restricting airflow by the means of his or her finger.

Many animals hear frequencies that humans do not hear. Most all wild game species produce a vocal call by utilizing a set of vocal cords generating a sound resounding through throat and nasal passages having various lengths, diameters, and other characteristic lengths. Each set of vocal cords in combination with various resonant cavities will produce a similar, but different sound wave pattern. Many of the instruments made to attract or locate animals do not necessary mimic these frequencies that are located above or below human hearing.

SUMMARY OF THE INVENTION

A wild game call may include a resonance piece and a mouth piece. The resonance piece may include a body, pipes, and a plug that may attach to a mouth piece. The resonance piece may be attached to the mouth piece. The body may be cylinder shaped. The pipes may be located on the distal end of the body.

Also a wild game call may include a mouth piece attached to the body. Additionally, the mouth piece may include a reed and a neck. The reed and the neck may be attached to the resonance piece by placing the reed and the need in the resonance piece and placing a plug in the remaining open area. The plug may squeeze or otherwise attach the mouth piece to the resonance piece.

Alternatively, a wild game call may include pipes of variable lengths attached to a splitter, which combines two pipe openings into one pipe opening. Also, a front pipe may be attached to the one pipe opening of the splitter. Additionally, a wild game call may include a mouthpiece attached to the front pipe comprising openings for exhaling, a reed; and fasteners to attach the reed to the mouth piece.

BRIEF DESCRIPTION OF THE DRAWINGS

The foregoing and other objects and features of the present invention will become more fully apparent from the following description and appended claims, taken in conjunction with the accompanying figures. Understanding that these figures depict only typical embodiments of an apparatus in accordance with the invention and are, therefore, not to be considered limiting of its scope, the invention will be described with additional specificity and detail through use of the accompanying figures in which:

DETAILED DESCRIPTION OF THE PREFERRED EMBODIMENTS

Figure 1:
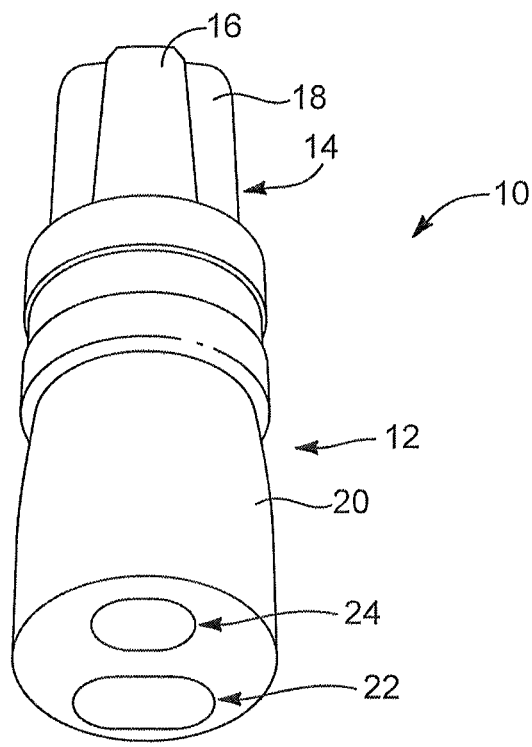
FIG. 1 is a photograph of an apparatus in accordance with the invention.
Figure 2:
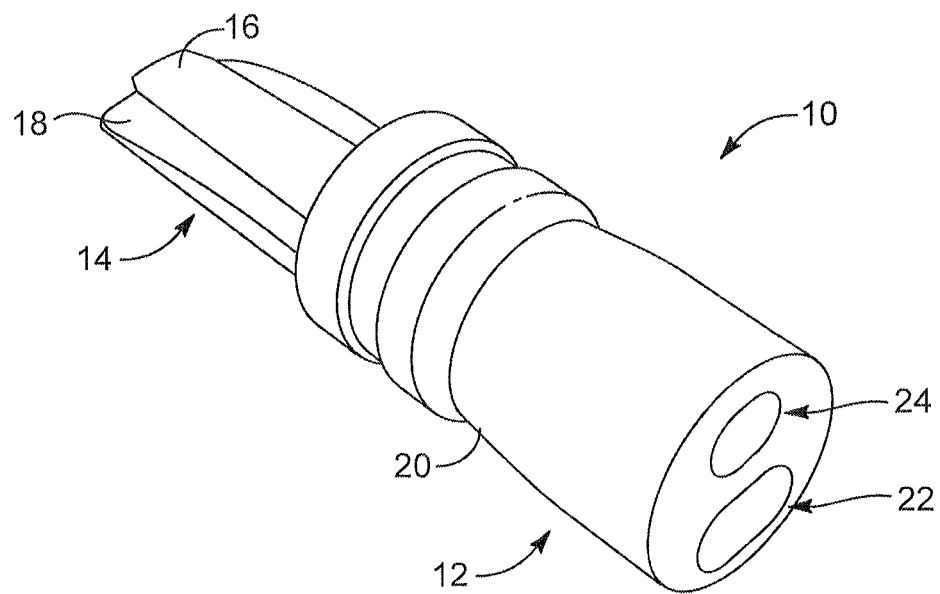
FIG. 2 is a photograph of the apparatus of FIG. 1.
Figure 3:
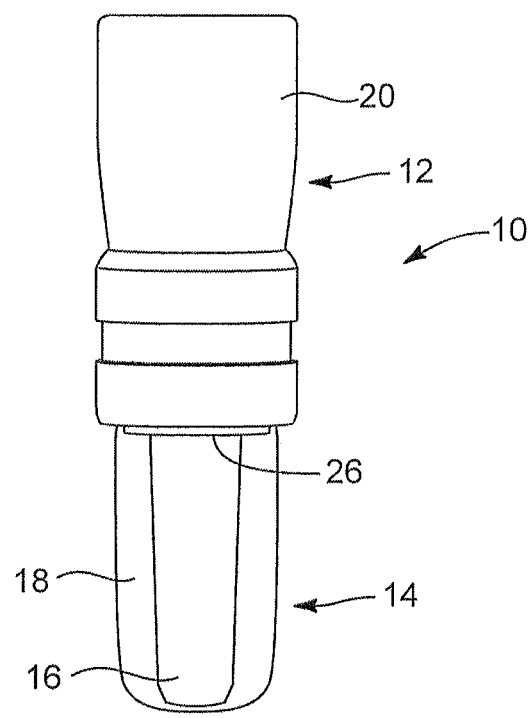
FIG. 3 is a photograph of the apparatus of FIG. 1.
Figure 4:
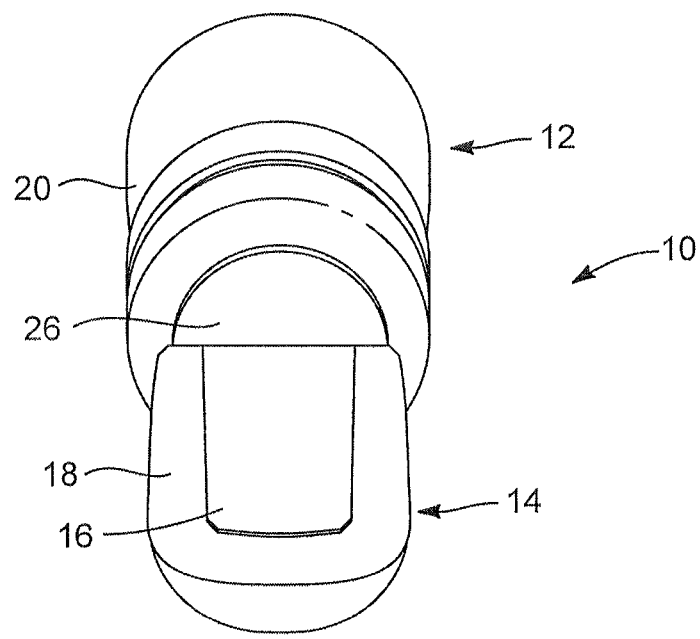
FIG. 4 is a photograph of the apparatus of FIG. 1.

It will be readily understood that the components of the present invention, as generally described and illustrated in the drawings herein, could be arranged and designed in a wide variety of different configurations. Thus, the following more detailed description of the embodiments of the system and methods of the present invention, as represented in the drawings, is not intended to limit the scope of the invention, but is merely representative of various embodiments in accordance with the invention. The illustrated embodiments will be best understood by reference to the drawings, wherein like parts are designated by like numerals throughout.

It has been found that animals have voices, just as humans have voices. That is, that the tone quality, the various resonant frequencies, the overall timbre of the voice of an animal may be unique to that species, as well as unique to an individual animal. The human ear hears voices, and the human mind distinguishes voices of individuals. Previous systems for bugles, game calls, and the like have often reflected very minimal ranges of frequency, residence. Accordingly, in a game call in accordance with the invention, at least two varieties of calls may rely on a combination of significant lengths (diameters, lengths, widths, etc., as used in an engineering and acoustical sense).

Accordingly, it has been found that the frequencies of sound emitted by an animal when it is generating sounds for some purpose may be analyzed. Accordingly, it has been found that the frequency response compares with or correlates with various aspects of the anatomy of the animal. For example, the throat portion of an animal has several characteristics lengths including minimum diameter, maximum diameter, length, and the like. Likewise, the mouth of an animal has a characteristic length of a diameter and may have multiple dimensions of diameter, width, etc. Similarly, the nasal passages of an animal have characteristic lengths, several characteristic diameters, various locations where widths can be measured, and provide an effect on sound.

Accordingly, in order to provide a sound that replicates the multiple frequencies generated within the head of an animal, and the throat thereof, beyond the vocal cords, are not replicated in prior art systems. Accordingly, in accordance with the invention, the inventor has analyzed the frequency distribution of calls made by various animals, for example, elk calls provide a sound that appears to be a whine of changing pitch. Likewise, that sound when analyzed spectrographically provides various frequencies over time, and various frequencies that occur simultaneously. Accordingly, it is possible to create resident chambers or pipes, just as organ pipes, tuned to provide various characteristic lengths (widths, diameters, lengths, etc.) in order to generate artificially the distribution of frequencies in the sounds generated. This physical phenomenon is driven by an initial sound generator to replicate the vibration of vocal cords. It has been found that the sound generator need not be a vocal chord assembly. That is, various types of vibration mechanisms may be implemented, generating a broad variety of frequencies. Accordingly, by attaching to the sound generator various chambers having selected characteristic lengths, the selected frequencies, associated with the selected wave lengths dictated by the characteristic lengths, may be optimized due to resonance around the energy of the original signal.

Accordingly, in one embodiment, an elk call may be made, or a call for another animal having characteristic passages that all receive their sound stimulus from a single sound generator (for example, a reed, a diaphragm, a flexible member, a vibrational member, or the like). Likewise, in a particular embodiment of a bugle type of call, resonance chambers may be selected to provide a variety of preferred resonant frequencies.

As a general matter it has been found that multiple chambers fed from a single sound generator provide a better, and better matched, set of frequencies of sound. The difference between prior art game calls, and game calls in accordance with the invention may be distinguished by the lack of texture or lack of variety and lack of intensities, in distribution of the proper frequencies.

Accordingly, in an apparatus and method in accordance with the invention, experiments were conducted with various passages, and with the various characteristic lengths of those passages (for example, pipes, tubes, etc.) in order to replicate the proper texture or distribution of frequencies of sound from an actual recording of an animal.

An apparatus 10 in accordance with the present invention may include a resonance piece 12 and a mouth piece 14. The resonance piece 12 may be attached to the mouth piece 14. In selected embodiments, a mouth piece 14 may be placed in a person's mouth and the person may exhale into the mouth piece 14 while controlling lip pressure on the reed 16. As a result of the exhale, the resonance piece 12 may offer multiple resonant chambers for a sound, or sounds.

Referring to FIG. 1-4, the resonance piece 12 may include a body 20, pipes 22, 24, and a plug 26. The resonance piece 12 may be formed of any suitable material. Suitable material may be selected to provide a desired strength, rigidity, cost, durability, sound, or the like. In selected embodiments, the resonance piece 12 may be formed of wood, plastic, metal, or other durable resonant products.

The mouth piece 14 may include a reed 16, and a neck 18. The mouth piece 14 may be formed of any suitable material. Suitable material may be selected to provide a desired strength, rigidity, cost, durability, sound, or the like. In selected embodiments, the mouth piece 14 may be formed of plastic or plastic like products.

Additionally, in selected embodiments, the resonance piece 12 may be formed with or otherwise connected to the mouth piece 14 in any suitable manner. For example, the resonance piece 12 may be friction fitted or glued to the mouth piece 14. Alternatively, the resonance piece 12 and the mouth piece 14 may be machined, cast, molded, or otherwise formed as a single, monolithic unit. In one embodiment, a plug 26 fitted to the resonance piece 12 wedges against the reed 16, opposite the mouth piece 14 after insertion of the mouth piece 14 and the reed 16 into the resonance piece 12.

The mouth piece 14 has a channel along its lengths, under the reed 16. The channel may have additional relief on the sides and at the end tip of the channel. The channel may preclude complete closure.

The reed 16 may be formed of any suitable, stiff yet flexible, material that will create a vibration or "disturbance" to cause a desired noise or tone. Suitable material may be selected to provide a desired strength, rigidity, cost, durability, sound, or the like. In selected embodiments, the reed 16 may be formed of plastic or plastic like products.

Additionally, the reed 16 may be flexible. For example, the reed 16 may be formed of a flexible material (e.g., flexible plastic), such as PET or mylar, suitable sized.

Also, the neck 18 may be shaped in any suitable form. In selected embodiments, the neck 18 may be formed as a portion of a cylinder. For example, the neck 18 may be shaped as a portion of a cylinder cut lengthwise thinning toward a distal end away from the reed 16. Additionally, the cylinder cut neck 18 may be hollow.

Additionally, in selected embodiments, the reed 16 may cover the any suitable area of the neck 18. For example, the reed 16 may cover the hollow area of the neck 18. In addition, the reed 16 may be formed of a flexible material (e.g., flexible plastic), thus, the reed 16 may move (e.g., vibrate) over the hollow area of the neck 18 producing a sound.

The body 20 may be formed of any suitable material. Suitable material may be selected to provide a desired strength, rigidity, cost, durability, sound, or the like. In selected embodiments, the body 20 may be formed of plastic or plastic like products. The body 20 may be shaped in any suitable form. In selected embodiments, the body 20 may be cylinder shaped.

Additionally, in selected embodiments, the body 20 includes pipes 22, 24. The pipes 22, 24 may be shaped in any form suitable. For example, a pipe 22 may be shaped larger than another pipe 24. Also, the pipes 22, 24 may be shaped in different forms (e.g., circular, oval, square, rectangular, etc) and include different numbers (e.g., one pipe, two pipes, three pipes, etc). All the pipes 22, 24 are divided from each other in the body and resonate with sound produced by the same reed 16.

The pipes 22, 24 may be located at on any suitable part of the body 20. For example, in certain embodiments, the pipes 22, 24 may be located on the front of the apparatus 10.

The plug 26 may be formed of any suitable material. Suitable material may be selected to provide a desired strength, rigidity, cost, durability, or the like. The plug 26 may be located at any suitable located on the body 20. For example, in selected embodiments, the plug 26 may be located in the rear of the body 20. Additionally, in selected embodiments, the plug 26 may be located above the reed 16 and the neck 18 holding the reed 16 and the neck 18 in a locked position.

Figure 5:
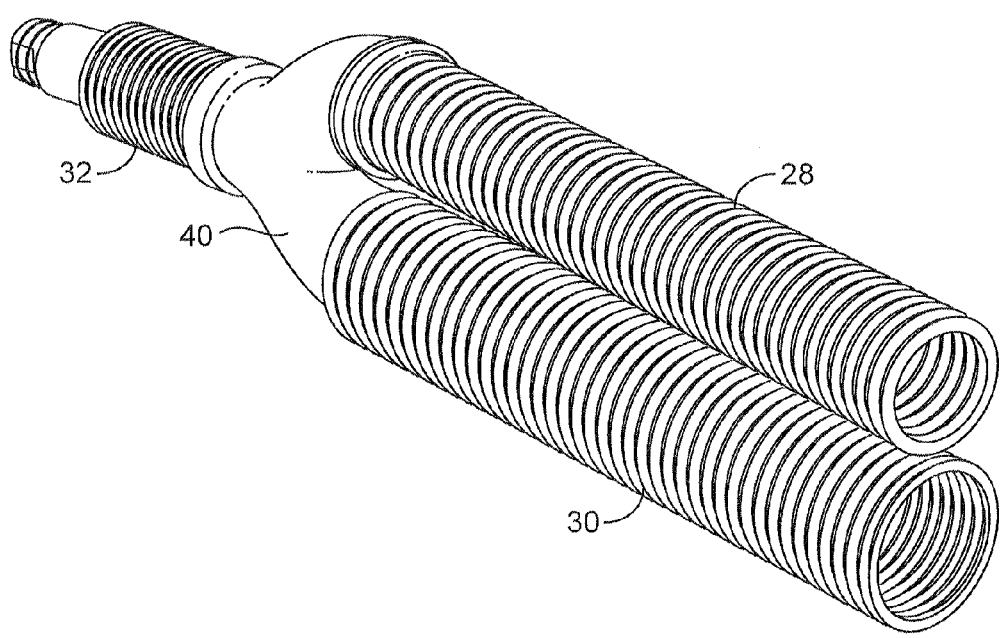
FIG. 5 is a photograph of an apparatus in accordance with the invention.
Figure 6:
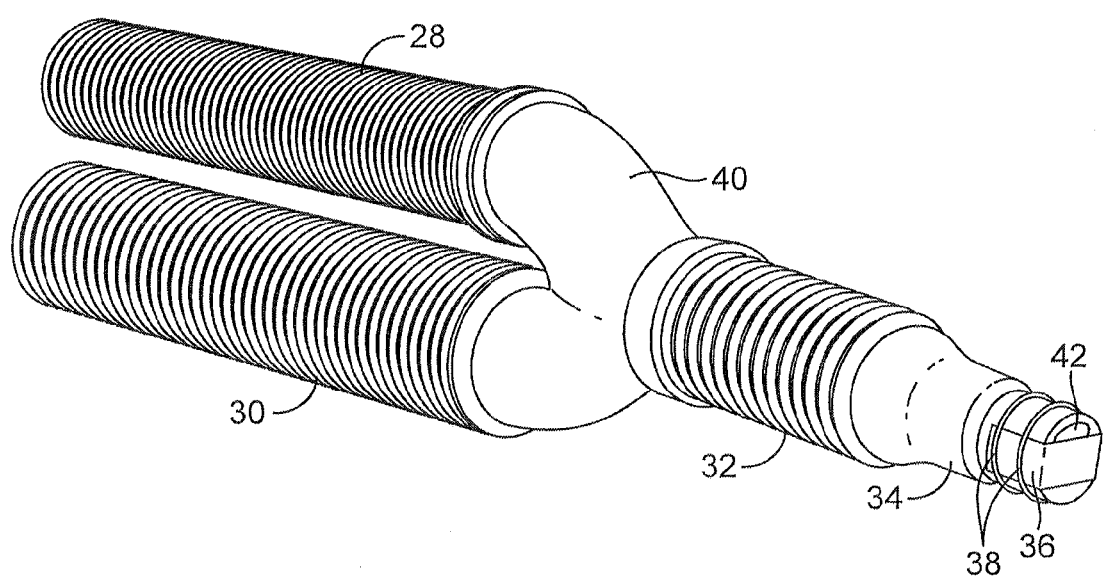
FIG. 6 is a photograph of the apparatus of FIG. 5.

Referring to FIGS. 5 and 6, as well as FIGS. 1-4 the apparatus 10 includes a splitting system. The splitting system may include pipes 28, 30, a front pipe 32, a mouth piece 34, a reed 36, fasteners 38, and a splitter 40.

The pipes 28, 30 may be formed of any suitable material. Suitable material may be selected to provide a desired strength, rigidity, cost, durability, or the like. In selected embodiments, the pipes 28, 30 may be formed of aluminum or plastic like products.

The pipes 28, 30 may be formed of any suitable length. Likewise, the pipes 28, 30 may include different lengths and diameters independent of each other downstream of their mutual separation.

The pipes 28, 30 may be formed with or otherwise connected to splitter 40 in any suitable manner. For example, in selected embodiments, the pipes 28, 30 may be glued and sealed with silicon to the splitter 40. Alternatively, the pipes 28, 30 and the splitter 40 may be machined, cast, molded, or otherwise formed as a single, monolithic unit.

The front pipe 32 may be formed of any suitable material. Suitable material may be selected to provide a desired strength, rigidity, cost, durability, or the like. In selected embodiments, the front pipe 32 may be formed of aluminum or plastic like products.

The front pipe 32 may be connected to the splitter 40 in any suitable manner. For example, in selected embodiments, the front pipe 32 may be glued and sealed with silicon to the splitter 40. Alternatively, the front pipe 32 and the splitter 40 may be machined, cast, molded, or otherwise formed as a single, monolithic unit.

The mouth piece 34 may be formed of any suitable material. Suitable material may be selected to provide a desired strength, rigidity, cost, durability, or the like. In selected embodiments, the mouth piece 34 may be formed of aluminum or plastic like products.

The mouth piece 34 may include openings 42. The mouth piece 34 may be shaped in any suitable shape. For example, in selected embodiments, the mouth piece 34 may be shaped as a cylinder thinning toward a distal end. In selected embodiments, the openings 42 may be located at the distal end of the mouth piece 34.

A reed 36 may be formed of any suitable material. Suitable material may be selected to provide a desired strength, rigidity, cost, durability, or the like. The reed 36 may be used to cover the openings 42. For example, in selected embodiments, the reed 36 may be used to cover one of the openings 42, or all or the openings 42.

The reed 36 may be attached or otherwise connected to the mouth piece 34 by fasteners 38. For example, the fasteners 38 may squeeze or otherwise attach the reed 36 to the mouth piece 34. The fasteners 38 may be formed of any suitable material, such as rubber, aluminum, plastic, etc.

The splitter 40 may be formed of any suitable material. Suitable material may be selected to provide a desired strength, rigidity, cost, durability, or the like. For example, in selected embodiments, the splitter 40 may be formed of aluminum, or plastic like products.

The splitter 40 may include a mechanism that makes one pipe opening separate into two pipe openings. For example, at one side of the splitter 40 there may be one pipe opening, and on the other side of the splitter 40 there may be two pipe openings.

The openings 42 may be shaped in any suitable form. The openings 42 may be located on the distal end of the mouth piece 34. A person may exhale into the openings 42. For example, a person may place his or her mouth over the openings 42 and exhale into the openings 42.

Figure 7:
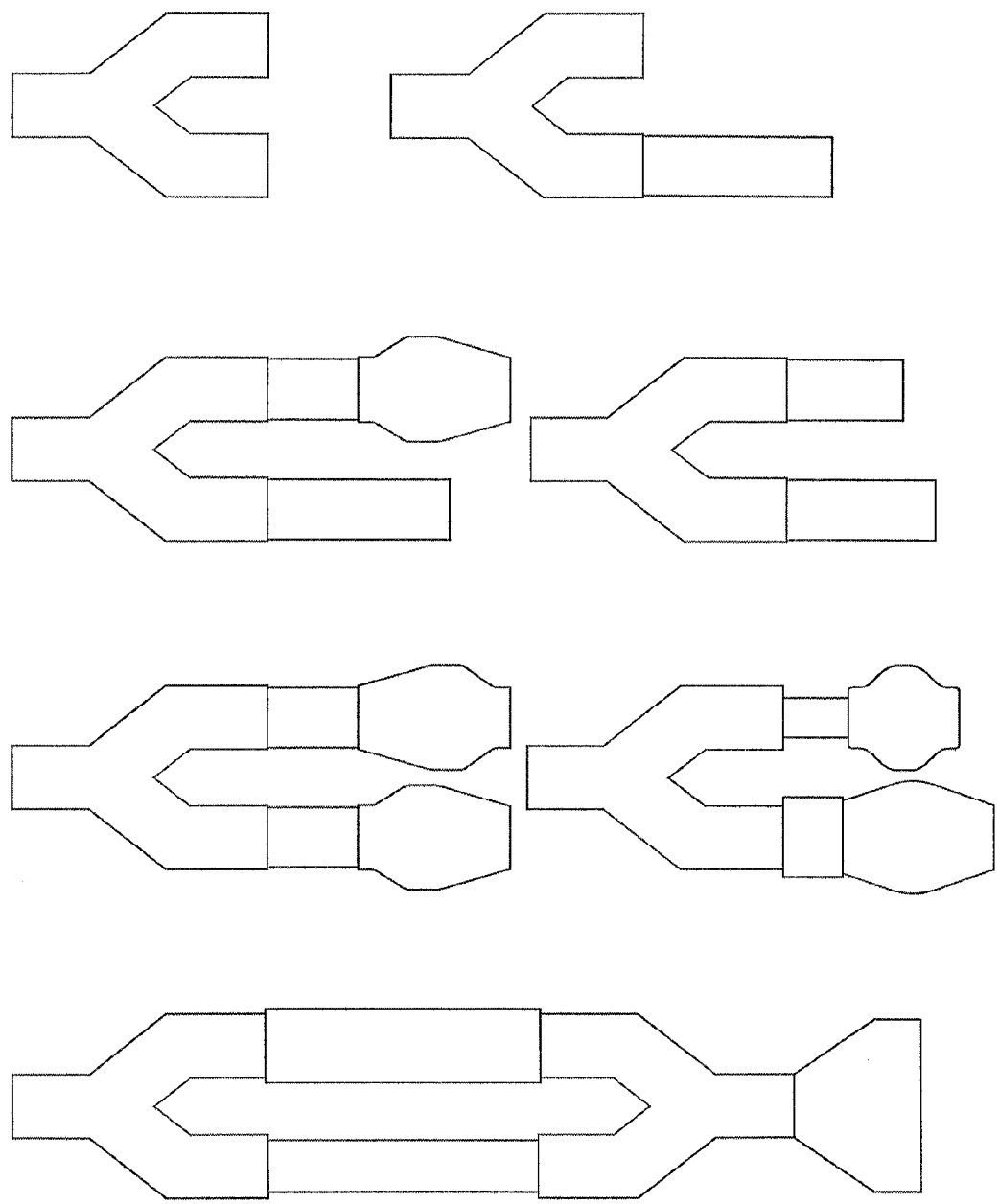
FIG. 7 is a top view of various alternative embodiments for game calls having split pipes stimulated by a single sound source.

Referring to FIG. 7, various lengths and diameters may be provided for the various pipes 28, 30 in the bugle 10, or other calls 10. Likewise, various connection mechanisms may be provided in order to connect a mouthpiece 34 to a splitter 40 prior to entry of sound into the multiple pipes 28, 30 of the apparatus 10. Likewise, the length of the front pipe 32 that acts as an initial residence chamber just beyond the mouthpiece 34 may be selected. Similarly, the diameter may be selected in accordance with a desired frequency response.

Figures 8, 9, 10:
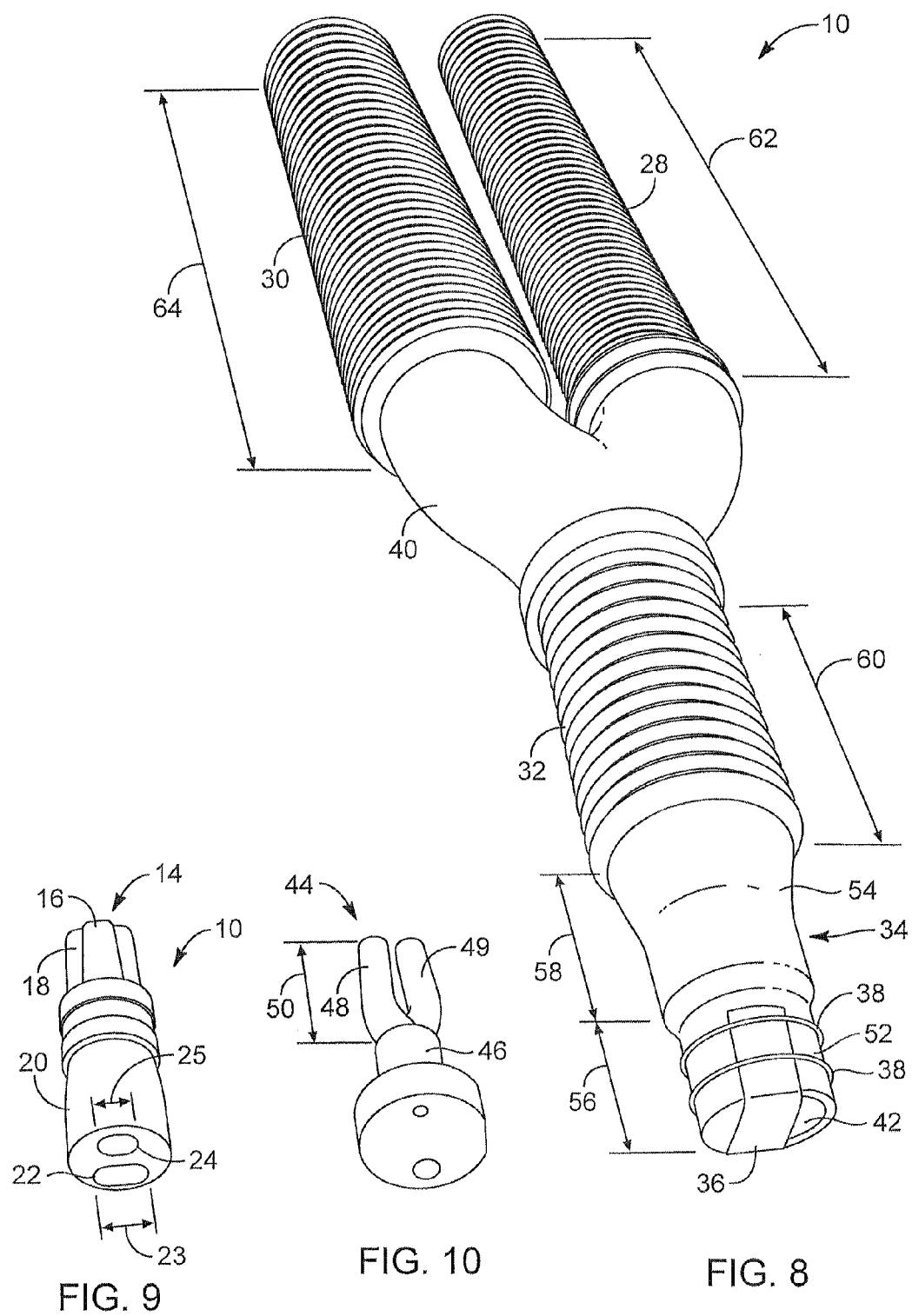
FIG. 8 is a perspective view of one embodiment of a bugle in accordance with the invention and having a pair of split pipes following an initial residence chamber all fed by a single sound source, a reed at the opening end thereof.
FIG. 9 is a perspective view of a small game call, in this instance an embodiment adapted as a cow call.
FIG. 10 is a perspective view of one embodiment of a core used for forming the initial residence chamber and the divided residence pipes of the call of FIGS. 1-4 and FIG. 9.

Referring to FIG. 8, in one embodiment of an apparatus 10 in accordance with the invention, the mouthpiece 34 may actually be formed to have an initial neck portion 52 having various characteristic dimensions, including the characteristic lengths or dimensions of an opening 42. Referring to FIG. 10, the opening 42 in one embodiment is open approximately half way across the area of the open cross-section of the neck portion 52. In the illustrated embodiment, a reed 36 is attached by connectors 38 that act as compression clamps to hold the reed in place. Accordingly, the tensions in reed 36 may be selected to provide the appropriate initial frequencies. In one embodiment, the lips of a user may be pursed across the opening 42, one lip touching on the reed 36 and the other lip touching on the edge of the opening of the neck 52. Accordingly, by various breaths, vocalizations, as well as trumpeting, of the lips, a user may create a variety and range of sounds through and across the reed 36, into the mouth piece 34. In general, a bell 54 may be provided to have characteristic lengths typical of the animal pursued. In one embodiment the bell 54 may be formed to connect to another pipe 32 that has been sized to provide resonant frequencies corresponding to the throat of an animal sought. Meanwhile, the splitter 40 divides the flow between two other characteristic pipes 28, 30. The pipes 28, 30 may correspond in general to the nasal passages, and oral passages respectively of the animal. Accordingly, the lengths 62, 64 of the pipes 28, 30 may also be selected to provide the effective frequencies. Similarly, the diameters of the pipes 28, 30 may be chosen as a single diameter each, a tapered diameter, or a convoluted multiple diameter in order to provide the characteristic frequencies. Likewise, the lengths 60 as well as the diameter or diameters of the pipe 32 may be selected to provide the richness of the texture of the resonant frequencies available in corresponding to the throat of an animal. Thus, the sound generator 36 generates an initial sound that resonants within the mouthpiece 34 and pipe 32, according to the characteristic lengths thereof in order to provide a set of desired frequencies in the texture of the sound. Likewise, the characteristic lengths 62, 64 in combination with the characteristic dimensions or lengths of the splitter 40 provide the characteristic frequencies generated by the pipes 28, 30 representing those additional frequencies or resonant frequencies in the vocalizations by an animal.

Referring to FIG. 9, in an apparatus 10 in accordance with the invention one embodiment of a game call may include a body 20 provided with pipes 22, 24 having disperate diameters or effective diameters. That is, a width 23 of a pipe 22, and a width 25 of a pipe 24 may each have their own characteristic dimension, while each of the pipes 22, 24 has an alternative diameter or effective length identified, respectively, as the width 66, and width 68. Or diameter 66, and diameter 68. In general, referring to FIGS. 9-12, the apparatus 10 may include a mouthpiece 14 having a neck 18 or bed 18 that receives a reed 16. The reed 16 may be held in place within an opening in the body 20 by a plug 26. In one embodiment of an apparatus and method in accordance with the invention, an opening in the body 20 may be formed by a core portion 46 or a chamber core 46. That is, the chamber core 46 forms a chamber into which fits both the neck or bed 18, and the plug 26 having the reed 16 wedged there between. Thus, the friction fit of the plug 26 and the neck or bed 18 together with the reed 16 there between holds all three pieces within the chamber or portion of the body 20 formed by the core 46. That is, in general, the core 44 represents a flexible material formed to replicate the passages, and thus be a pattern or core to define the pipes 22, 24.

In the illustrated embodiment, the two branches 48, 49 of the core 44 correspond to the pipes 22, 24 respectively.

As a practical matter, it has been found that the sound generator 16, 36 of an apparatus in accordance with the method is often not so important to the overall sound quality or spectrum of frequencies acoustically available as considered by some developers in the prior art. Rather, the resonant frequencies of the various pipes 28, 30, 32, 22, 24 appear to control the resonance, so long as some initial frequency is available to generate that particular resonant frequency supported by the significant lengths of the various pipes 22, 24, 28, 30, 32, 34, 40.

Figure 11:
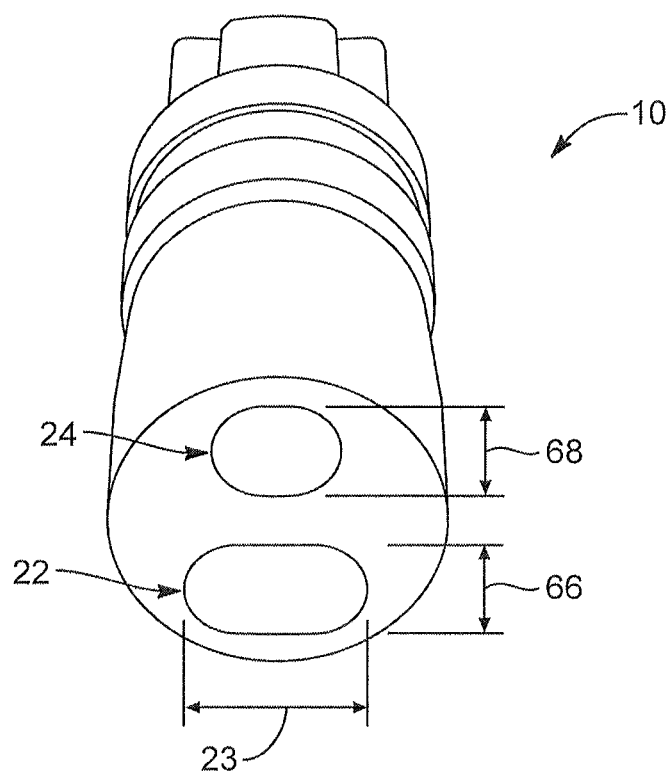
FIG. 11 is a perspective view from one end of the game call of FIG. 9.
Figure 12:
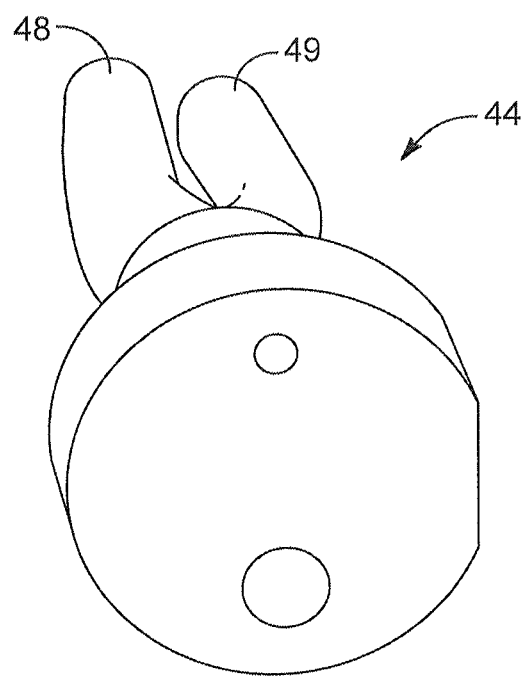
FIG. 12 is a perspective view of the core of FIG. 10 used in forming the pipes or cavities in the call of FIG. 11 and FIG. 9.
Figure 13:
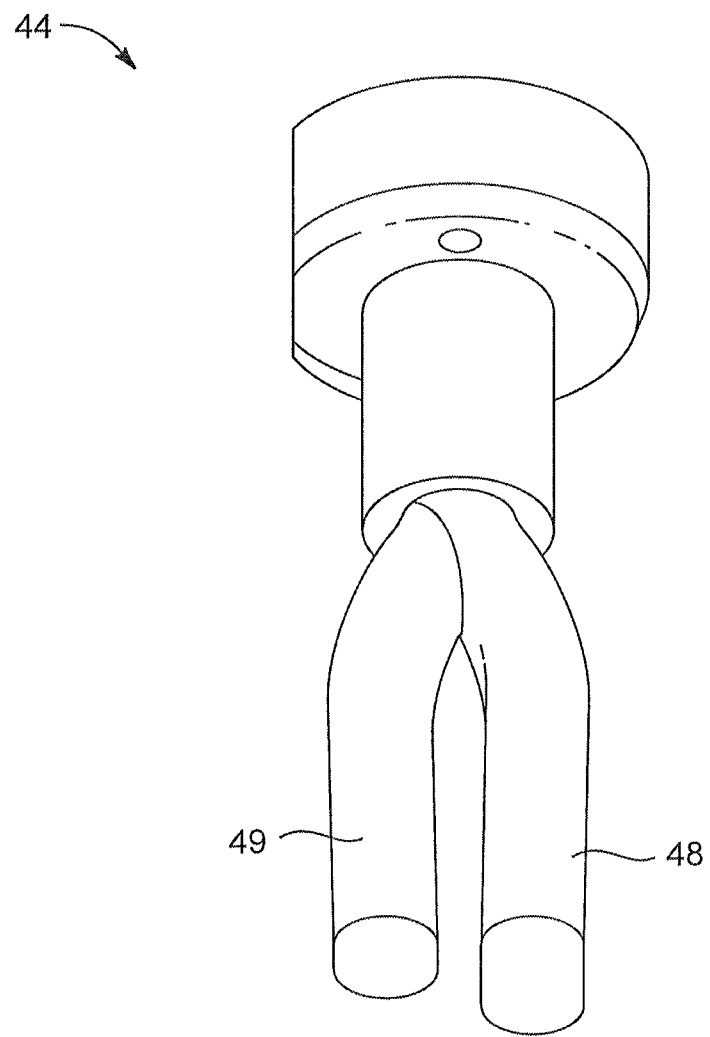
FIG. 13 is another perspective view of the core of FIG. 10 used in forming the pipes or cavities in the call of FIG. 11 and FIG. 9.

Under the reed 16 of FIGS. 9-11 a channel is formed to extend axially along the length of the bed 18 or neck 18. The channel provides an opening all the way through into the body 20, until the air associated with the generation of sound on the reed 16 is discharged into the various pipes 22, 24. In certain embodiments of an apparatus 10 in accordance with the invention, relief may be provided by way of additional removal of material corresponding to each lateral side of the reed 16 extending axially along the sides of the channel in the bed 18. Accordingly, the reed 16 is effectively precluded from closing down against the bed 18. Also, to that same result, relief is formed in the opening end of the channel near the extreme upper end of the reed as illustrated in FIG. 9, in order that the reed can never be closed down, as a practical matter, by a user, when in use. Accordingly, various squawks and squeaks are avoided an a consistent tone is easily obtained by a user in using the apparatus 10 in accordance with the invention.

The wild game call may produce a wide range of calls. The user can, with a little practice, create chirps, mews, and estrous whines. Additionally, the user may produce from very soft, quiet calls to loud calls for locating elk at long distances.

For example, one method of use for a cow call may be for a user to use his or her top lip to apply firm pressure to the reed. Too much pressure may cause the reed to stick, while too little will not produce a clean high note. If need be, a user may pull the lip slightly over the teeth. Also, a user may begin the call with his or her lip approximately between about ⅛ inch and about ¼ inch from the tip of the reed. A user may blow air into the call, and keep his or her mouth in a letter "E". This will produce the high note. A user may finish the call by letting his or her mouth relax slightly as if the user was saying the letter "O", at the same time reduce the amount of air the user is blowing into the call.

Another example, and another method of use may be for a user to begin and end the call in the same manner, but when finishing the call the user may move his or her lip along the reed away from the tip at the same time relax his or her mouth and reduce the air. Some people will actually let there lip roll back over their teeth with this method.

Additionally, chirp sounds (e.g., a very short call) may be about ½ second, mew sounds (e.g., a longer call) may be between about one and about two seconds, and estrous sounds (e.g., a long whine) may be between about two and about three seconds.

A user may produce soft quiet calls by using less air. Loud calls are best produced by starting the call slightly further from the reed tip and use more air. The user may adjust the reed by moving it out for a lower pitch, in for the higher pitch. Also, very little movement will change the pitch. The reed should not extend past the soundboard (bed or neck of mouthpiece).

What is claimed and desired to be secured by United States Letters Patent is:

1. A wild game call device comprising:
    a resonance piece compromising a body, pipes, a plug, and a splitter, the pipes comprising a first pipe and a second pipe having variable lengths, the first pipe and the second pipe also having an opening, the splitter attaching on a first end to the opening of the first pipe and the second pipe, which combines the openings into one pipe opening on a second end of the splitter; and
    a mouth piece attached to the one pipe opening on the splitter to receive air therein,
    wherein the variable lengths of the first pipe and the second pipe form a sound from the air, the sound exhibiting different frequencies that correspond to the first pipe and the second pipe, wherein the frequencies are found in vocalizations by an animal.

2. A wild game call device as in claim 1, wherein the mouth piece compromising a reed and a neck.

3. A wild game call device as in claim 2, wherein the plug is placed to attach the reed and the neck to the splitter.

4. A wild game call device comprising:
    at least two pipes of variable lengths and each having an opening;
    a splitter attached on a first end to the opening of the at least two pipes, which combines the openings into one pipe opening on a second end of the splitter;
    a front pipe attached to the one pipe opening of the splitter;
    a mouth piece attached to the front pipe comprising an opening for receiving air resulting from exhaling by an end user;
    a reed disposed in position to vibrate in response to the air; and
    fasteners to attach the reed to the mouth piece.

5. The game call of claim 1, wherein the first pipe and the second pipe are integrated into the body.

6. The game call of claim 5, wherein the body and the mouthpiece form a monolithic unit.

7. The game call of claim 1, wherein the first length and the second length define a first diameter for the first pipe and a second diameter for the second pipe that is different from the first diameter.

8. The game call of claim 4, wherein the at least two pipes form resonant chambers that generate sound from the air, the sound exhibiting different frequencies.

9. The game call of claim 8, wherein the different frequencies are found in vocalization of an animal.

10. The game call of claim 4, wherein the at least two pipes generate sound that replicates a distribution of frequencies found in vocalization of an animal.

11. The game call of claim 4, further comprising a body that incorporates the at least to pipes into a monolithic unit.

12. A game call, comprising:
   an inlet;
   a sound generator in flow connection with the inlet, the sound generator configured to excite air proximate the sound generator at a first frequency;
   a plurality of pipes coupled with the sound generator, the plurality of pipes comprising a first pipe and a second pipe having variable lengths; and
   a splitter attached on a first end to the opening of the at least first pipe and the second pipe, which combines the openings into one pipe opening on a second end of the splitter, the one pipe opening in flow connection with the inlet and the sound generator,
   wherein the variable lengths configure the first pipe and the second pipe to resonate in response to the first frequency at, respectively, a second frequency and a third frequency, both found in vocalization by an animal.

13. The game call of claim 12, wherein the sound generator comprises a reed.

14. The game call of claim 12, wherein the first length defines a first diameter for the first pipe and the second length defines a second diameter for the second pipe that is different from the first diameter.

15. The game call of claim 12, further comprising a body incorporating the first pipe and the second pipe as a monolithic unit.

16. The game call of claim 12, further comprising a mouth piece forming the inlet.

17. The game call of claim 16, wherein the mouthpiece incorporates the sound generator.

18. The game call of claim 16, further comprising fasteners to attach the sound generator to the mouthpiece.

19. The game call of claim 12, wherein the first pipe and the second pipe have separate openings to generate sound at, respectively, the second frequency and the third frequency.

* * * * *

UNITED STATES PATENT AND TRADEMARK OFFICE
CERTIFICATE OF CORRECTION

PATENT NO.       : 8,727,828 B2                                        Page 1 of 1
APPLICATION NO.  : 13/221730
DATED            : May 20, 2014
INVENTOR(S)      : Pribbanow It is certified that error appears in the above-identified patent and that said Letters Patent is hereby corrected as shown below:

On the title page item [75]
Rpy, UT (US) should read Roy, UT (US)

Signed and Sealed this
Fifth Day of August, 2014

Michelle K. Lee
*Deputy Director of the United States Patent and Trademark Office*